US006949004B1

(12) United States Patent
Broussalian et al.

(10) Patent No.: US 6,949,004 B1

(45) Date of Patent: Sep. 27, 2005

(54) METHOD FOR REDUCING POLE AND ALUMINA RECESSION ON MAGNETIC RECORDING HEADS

(75) Inventors: Chris Broussalian, Loveland, CO (US); Kim Brandt, Boulder, CO (US)

(73) Assignee: Maxtor Corporation, Longmont, CO (US)

( * ) Notice: Subject to any disclaimer, the term of this patent is extended or adjusted under 35 U.S.C. 154(b) by 123 days.

(21) Appl. No.: 10/430,530

(22) Filed: May 6, 2003

Related U.S. Application Data

(60) Provisional application No. 60/408,621, filed on Sep. 6, 2002.

(51) Int. Cl.[7] ................................................ B24B 1/00

(52) U.S. Cl. ............................. 451/5; 451/29; 451/57; 451/58; 360/129; 29/603.12

(58) Field of Search ............................... 451/57, 58, 5, 451/29–31; 360/129; 29/603.16, 603.12, 29/841

(56) References Cited

U.S. PATENT DOCUMENTS

| | | | | |
|---|---|---|---|---|
| 6,226,151 | B1 | 5/2001 | Haddock | |
| 6,596,468 | B1 * | 7/2003 | Han et al. | 430/315 |
| 6,690,542 | B1 * | 2/2004 | Wang | 360/129 |
| 6,776,690 | B2 * | 8/2004 | Bunch et al. | 451/29 |
| 6,776,917 | B2 * | 8/2004 | Hsiao et al. | 216/88 |
| 6,817,086 | B2 * | 11/2004 | Lu et al. | 29/603.15 |
| 6,846,222 | B2 * | 1/2005 | Church et al. | 451/5 |
| 2003/0200041 | A1 * | 10/2003 | Church et al. | 702/104 |

* cited by examiner

*Primary Examiner*—George Nguyen

(74) *Attorney, Agent, or Firm*—David M. Sigmond

(57) ABSTRACT

A manufacturing process for reducing magnetic spacing loss in a magnetic recording head. The recession of the transducer relative to the substrate at the air bearing surface is decreased by applying a coating of sacrificial material such as diamond-like carbon to the upper surfaces of the substrate, the transducer, and the encapsulation material such as alumina prior to final kiss lapping. The recession due to the alumina being softer than the substrate is greatly reduced since the DLC is kiss-lapped.

55 Claims, 4 Drawing Sheets

METHOD FOR REDUCING POLE AND ALUMINA RECESSION ON MAGNETIC RECORDING HEADS

CROSS-REFERENCE TO RELATED APPLICATIONS

This application claims priority from U.S. Provisional Patent Application No. 60/408,621, filed Sep. 6, 2002, entitled "Method For Reducing Pole And Alumina Recission On GMR Heads," the contents of which are incorporated herein by reference.

FIELD OF THE INVENTION

This application relates to a method for producing a magnetic recording head for a data storage application, and more particularly to an improved lapping process for reducing the spacing between the head and the data storage media.

BACKGROUND OF THE INVENTION

In hard disk drives, data is written to and read from magnetic recording media, herein called disks, utilizing magnetoresistive (MR) transducers commonly referred to as MR heads. Typically, one or more disks having a thin film of magnetic material coated thereon are rotatably mounted on a spindle. An MR head mounted on an actuator arm is positioned in close proximity to the disk surface to write data to and read data from the disk surface.

During operation of the disk drive, the actuator arm moves the MR head to the desired radial position on the surface of the rotating disk where the MR head electromagnetically writes data to the disk and senses magnetic field signal changes to read data from the disk. Usually, the MR head is integrally mounted in a carrier or support referred to as a slider. The slider generally serves to mechanically support the MR head and any electrical connections between the MR head and the disk drive. The slider has an air bearing surface (ABS), which allows it to fly over and maintain a uniform distance from the surface of the rotating disk. Alternatively, the slider may be designed to just barely remain in contact with the rotating disk during operation, as is disclosed in U.S. Pat. No. 6,226,151, the contents of which are incorporated herein by reference.

Typically, an MR head includes an MR read element to read recorded data from the disk and an inductive write element to write data to the disk. The read element includes a thin magnetoresistive sensor stripe sandwiched between two magnetic shields that are electrically connected together but are otherwise isolated. A constant current is passed through the sensor stripe, and the resistance of the sensor stripe varies in response to a previously recorded magnetic pattern on the disk. In this way, a corresponding varying voltage is detected across the sensor stripe. The magnetic shields help the sensor stripe to focus on a narrow region of the disk, hence improving the spatial resolution of the read head.

Earlier MR sensors operated on the anisotropic magnetoresistive (AMR) effect in which a component of the read element resistance varied as the square of the cosine of the angle between the magnetization and the direction of sense current flowing through the read element. Most current disk drive products utilize a different, more pronounced magnetoresistive effect known as the giant magnetroresistive (GMR) or spin valve effect. This effect utilizes a layered magnetic sensor that also has a change in resistance based on the application of an external magnetic field.

Competitive pressures within the computer industry require progressively increasing storage capacity within a given footprint for a disk drive. To provide this increased storage capacity, it is necessary to increase the areal density of data stored on the disk. Increasing areal density drives other constraints. It is desirable for the read sensor to be located closer to the disk in order to compensate for the smaller flux levels provided from the smaller area on the disk where a given bit of data is recorded. The magnetic field detected by the sensor in the vicinity of the disk increases exponentially as the sensor is moved closer to the disk.

Taking on increased prominence is the recession of the read/write transducer and the surrounding aluminum oxide ($Al_2O_3$), known as pole tip recession (PTR) and alumina recession (ALR), respectively. Current read/write heads are produced by depositing a series of thin films on top of a substrate that may be composed of a harder material such as $Al_2O_3$—TiC (titanium carbon). The transducer is largely composed of materials such as nickel iron (NiFe) and is surrounded by the $Al_2O_3$. The transducer and alumina materials are significantly softer than the substrate. When the entire structure of the deposited layers on the substrate is lapped back to create the air bearing surface, the amount of alumina and transducer lapped away is greater than the amount of substrate that is lapped away. This results in an air bearing surface that is not planar. Instead, the alumina portion of the ABS is recessed relative to the substrate portion of the ABS. This is similarly the case for the portion of the transducer along the ABS. There may be some difference between the relative heights of the transducer and the alumina on the ABS due to masking, etching, and other factors. As can be appreciated, the recession of the transducer relative to the ABS increases the spacing between the transducer and the disk.

In prior art disk drives, this amount of recession was not a significant percentage of the spacing of the transducer relative to the disk. As fly heights decrease, however, in order to achieve stronger signal levels and allow for increased data density, the PTR is becoming a more significant contributor to magnetic spacing loss.

Others have attempted to minimize PTR in magnetic recording heads by modifying the various lapping attributes such as diamond size and the composition of the slurry material. In addition, others have modified various cleaning attributes that are utilized in the sputter etch cleaning process prior to carbon overcoat deposition, such as sputter etching, which uses high energy atoms to burn away organics. Different gases, pressures, and voltages have been experimented with.

Most existing magnetic recording heads have been produced with time-based lapping procedures that have less precise control than is available today. For example, in years past it may have been typical to lap away 100 angstroms of material with a precision of plus or minus 20 angstroms. In addition, it is also now possible to utilize the transducer as a sensor during the lapping operation. For example, it is possible to measure the resistance of the GMR read sensor while lapping (or during breaks in the lapping process) to determine when a desired amount of lapping has occurred so that the desired stripe height for the sensor can be achieved.

Many challenges remain in order to reduce magnetic spacing loss. It is against this background and a desire to improve on the prior art that the present invention has been developed.

SUMMARY OF THE INVENTION

A broad objective of the present invention is to provide a magnetic recording head with reduced magnetic spacing loss. Another objective of the present invention is to reduce diamond contamination in a magnetic recording head from lapping.

In carrying out these and other objectives, features, and advantages of the present invention, a process for manufacturing a read/write head for a data storage application is provided. The process includes producing a read/write transducer embedded in an encapsulation material deposited on a substrate and performing an initial lapping operation to remove a portion of the substrate and encapsulation material and create a lapped surface. The process also includes depositing a sacrificial material on the lapped surface, the sacrificial material having a hardness greater than the hardness of the encapsulation material and performing an additional lapping operation on the sacrificial material to remove at least a substantial majority of the sacrificial material.

The sacrificial material may be diamond-like carbon. The sacrificial material may be in the range of or greater than the hardness of the substrate. The process may further include monitoring a characteristic of the transducer to determine when to cease the additional lapping operation. The monitored transducer characteristic may be a resistance of a portion of the transducer. The portion of the sacrificial material adjacent to the substrate may be entirely removed and the portion of the sacrificial material adjacent to the encapsulation material may not be entirely removed. The transducer may include an MR or GMR read sensor. The substrate may include aluminum oxide and titanium carbon. The encapsulation material may include aluminum oxide.

Another aspect of the present invention relates to a process for manufacturing a read/write head for a data storage application. The process includes producing a read/write transducer embedded in an encapsulation material deposited on a substrate, depositing a sacrificial material on a side of the structure, the sacrificial material having a hardness greater than the hardness of the encapsulation material, and performing a lapping operation on the sacrificial material to remove at least a substantial majority of the sacrificial material.

Prior to depositing the sacrificial material, an initial lapping operation may be performed.

Another aspect of the present invention relates to a process for manufacturing a read/write head for reading and writing data to and from an adjacent storage media in a data storage application. The process includes producing a read/write transducer with an exposed portion on a side that will face toward the adjacent storage media. The process also includes depositing a sacrificial material on the side of the read/write transducer prior to final lapping, wherein the sacrificial material has a hardness greater than a portion of the exposed portion of the structure.

The process may further include, after depositing the sacrificial material, performing a lapping operation on the sacrificial material to remove at least a substantial majority of the sacrificial material.

Another aspect of the present invention relates to a process for manufacturing a read/write head for a data storage application. The process includes producing a read/write transducer embedded in alumina deposited on a substrate, wherein the alumina has a hardness less than the substrate and performing an initial lapping operation to remove a portion of the substrate and alumina and create a lapped surface. The process also includes depositing a layer of diamond-like carbon on the lapped surface, the diamond-like carbon having a hardness greater than the alumina and performing an additional lapping operation on the diamond-like carbon to remove at least a substantial majority of the portion of the diamond-like carbon in the region of the substrate.

Numerous additional features and advantages of the present invention will become apparent to those skilled in the art upon consideration of the further description that follows.

DETAILED DESCRIPTION OF THE PREFERRED EMBODIMENT

Reference will now be made to the accompanying drawings, which assist in illustrating the various pertinent features of the present invention. Although the present invention will now be described primarily in conjunction with disk drives, it should be expressly understood that the present invention might be applicable to other applications where reduced magnetic spacing loss from a magnetic recoding head is required/desired. In this regard, the following description of a magnetic recoding head in a disk drive is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain best modes known of practicing the invention and to enable others skilled in the art to utilize the invention in such, or other embodiments and with various modifications required by the particular application or use of the present invention.

Figure 1:
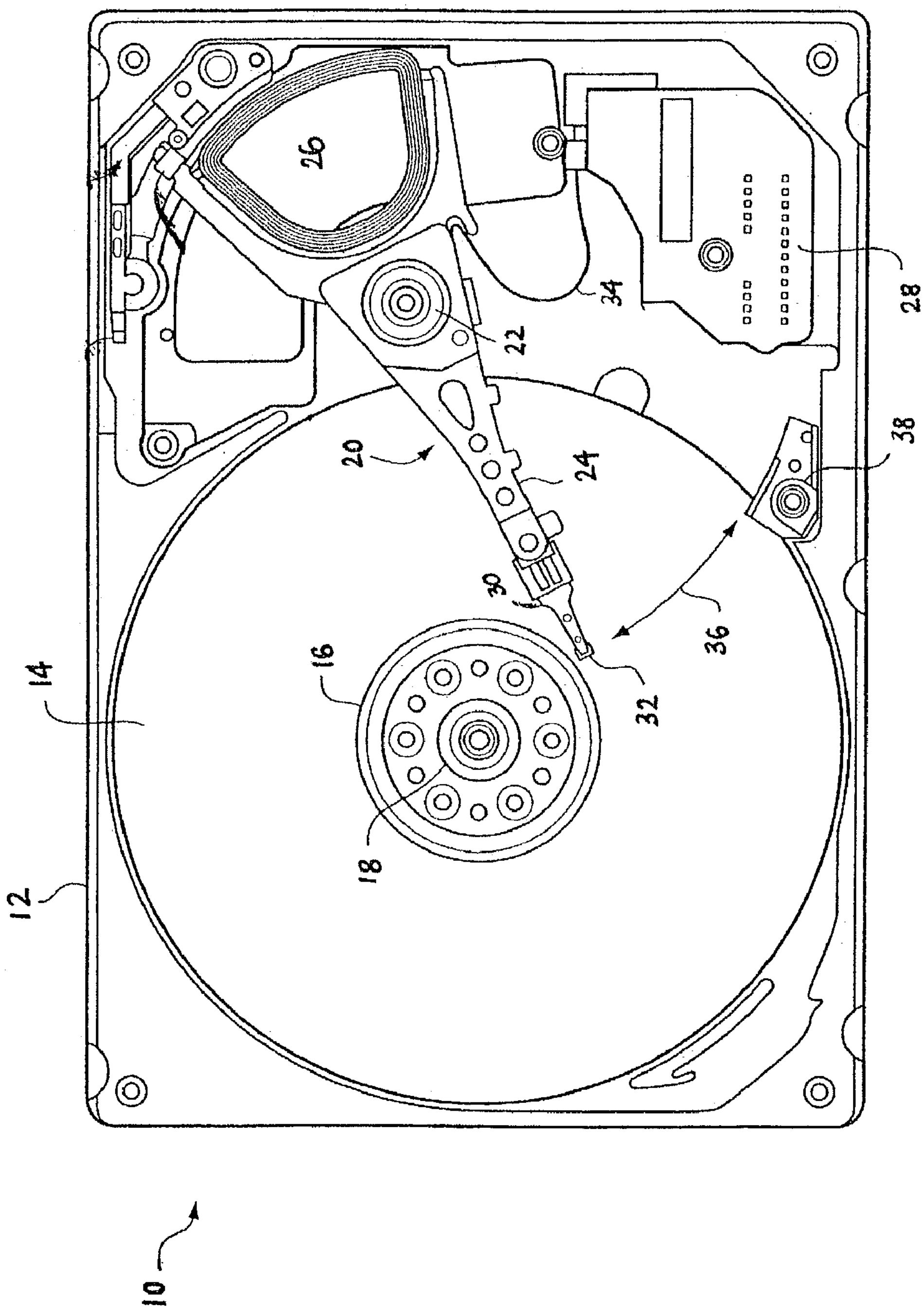
FIG. 1 is a top view of a disk drive that utilizes a head of the present invention.

FIG. 1 illustrates one embodiment of a disk drive 10. The disk drive 10 generally includes a base plate 12 and a cover (not shown) that may be disposed on the base plate 12 to define an enclosed housing or space for the various disk drive components. The disk drive 10 includes one or more data storage disks 14 of any appropriate computer-readable data storage media. Typically, both of the major surfaces of each disk 14 include a plurality of concentrically disposed tracks for data storage purposes. Each disk 14 is mounted on a hub or spindle 16, which in turn is rotatably interconnected with the base plate 12 and/or cover. Multiple disks 14 are typically mounted in vertically spaced and parallel relation on the spindle 16. Rotation of the disk 14 is provided by a spindle motor 18 that is coupled to the spindle 16 to spin the disk 14 at an appropriate rate.

The disk drive 10 also includes an actuator arm assembly 20 that pivots about a pivot bearing 22, which in turn is rotatably supported by the base plate 12 and/or cover. The actuator arm assembly 20 includes one or more individual rigid actuator arms 24 that extend out from near the pivot bearing 22. Multiple actuator arms 24 are typically disposed in vertically spaced relation, with one actuator arm 24 being provided for each major data storage surface of each disk 14. Other types of actuator arm assembly configurations could be utilized as well, such as an "E" block having one or more rigid actuator arm tips or the like that cantilever from a common structure. In any case, movement of the actuator arm assembly 20 is provided by an actuator arm drive assembly, such as a voice coil motor 26 or the like. The voice coil motor 26 is a magnetic assembly that controls the operation of the actuator arm assembly 20 under the direction of control electronics 28. Any appropriate actuator arm assembly drive may be utilized by the disk drive 10, including a linear drive (for the case where the actuator arm assembly 20 is interconnected with the base plate 12 and/or cover for linear movement versus the illustrated pivoting movement about the pivot bearing 22) and other types of rotational drives.

A load beam or suspension 30 is attached to the free end of each actuator arm 24 and cantilevers therefrom. Typically, the suspension 30 is biased generally toward its corresponding disk 14 by a spring-like force. A slider 32 is disposed at or near the free end of each suspension 30. What is commonly referred to as the "head" (e.g., transducer) is appropriately mounted on the slider 32 and is used in disk drive read/write operations.

The head on the slider 32 may utilize various types of read/write technologies such as anisotropic magnetoresistive (AMR), giant magnetoresistive (GMR), and tunneling magnetoresistive (TuMR), other magnetoresistive technologies, or other suitable technologies.

AMR is due to the anisotropic magnetoresistive effect with a normalized change in resistance ($\Delta R/R$) of 2–4%. GMR results from spin-dependent scattering mechanisms between two magnetic layers (or more). The typical use in recording heads is the spin valve device that uses a free layer to detect external fields, and a pinned magnetic layer. The normalized change in resistance is typically 8–12%, but can be as large as 15–20% when used with specular capping layers and spin-filter layers. TuMR is similar to GMR, but is due to spin dependent tunneling currents across an isolation layer. The typical embodiment includes a free layer and a pinned layer separated by a insulating layer of $Al_2O_3$ with the current flowing perpendicular to the film plane, producing normalized change in resistance of 12–25%. The term magnetoresistive as used herein refers to all these magnetoresistive sensors and any others in which a variation in resistance of the sensor due to the application of an external magnetic field is detected. The biasing forces exerted by the suspension 30 on its corresponding slider 32 attempt to move the slider 32 in the direction of its corresponding disk 14. Typically, this biasing force is such that if the slider 32 were positioned over its corresponding disk 14, without the disk 14 being rotated at a sufficient velocity, the slider 32 would be in contact with the disk 14.

The head on the slider 32 is interconnected with the control electronics 28 by a flex cable 34 that is typically mounted on the actuator arm assembly 20. Signals are exchanged between the head and its corresponding disk 14 for disk drive read/write operations. The voice coil motor 26 is utilized to pivot the actuator arm assembly 20 to simultaneously move the slider 32 along a path 36 and across the corresponding disk 14 to position the head at the desired/required radial position on the disk 14 (i.e., at the approximate location of the correct track on the disk 14) for disk drive read/write operations.

When the disk drive 10 is not in operation, the actuator arm assembly 20 is pivoted to a parked position to dispose each slider 32 generally at or beyond a perimeter of its corresponding disk 14, but in any case in vertically spaced relation to its corresponding disk 14. This is commonly referred to as dynamic load/unload. In this regard, the disk drive 10 includes a ramp assembly 38 that is disposed beyond a perimeter of the disk 14 to typically move the corresponding slider 32 vertically away from its corresponding disk 14 and also exert a retaining force on the actuator arm assembly 20. Any configuration for the ramp assembly 38 that provides the desired parking function may be utilized. The disk drive 10 could also be contact start/stop, where the actuator arm assembly 20 would pivot in a direction to dispose the slider 32 typically toward an inner, non-data storage region of the corresponding disk 14. Terminating the rotation of the disk 14 in this type of disk drive would result in the slider 32 establishing contact with or landing on the corresponding disk 14, and the slider 32 would remain on the disk 14 until disk drive operations are re-initiated.

The slider 32 may be configured to fly on an air bearing during rotation of its corresponding disk 14 at a sufficient velocity. The slider 32 may be disposed at a pitch angle such that its leading edge is disposed further from its corresponding disk 14 than its trailing edge. The transducer would typically be incorporated on the slider 32 generally toward its trailing edge since this is positioned closest to its corresponding disk 14. Other pitch angles/orientations could also be utilized for flying the slider 32.

Figure 2:
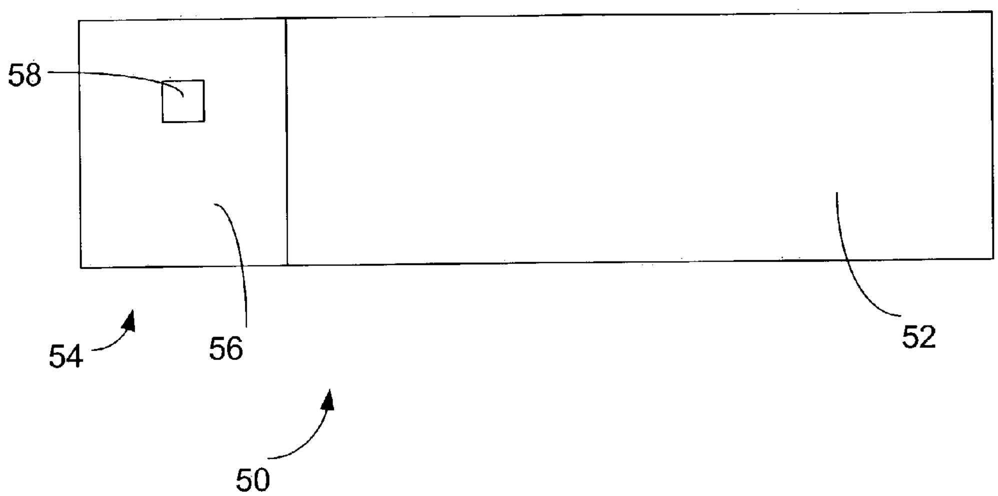
FIG. 2 is a schematic view of a portion of a magnetic recording head in an early stage in the process of the present invention.

FIG. 2 illustrates a magnetic recording head 50 on the slider 32. The magnetic recording head 50 includes a substrate 52 upon which a multi-layered transducer element 54 is manufactured by depositing thin film layers on top of thin film layers, in a conventional manner. The transducer element 54 can be generally understood to include (1) an insulator material such as aluminum oxide ($Al_2O_3$), referred to herein as the alumina material 56, and (2) the transducer 58 which includes a read element and a write element. Details of the read and write elements are omitted here for ease of understanding the invention which relates generally to lapping processes. The transducer element 54 has been deposited on one side of the substrate 52, and the transducer 58 is embedded within the alumina material 56. At this point in the manufacturing process, the magnetic recording head 50 is most likely still attached to adjacent magnetic recording heads as part of a row of magnetic recording heads. The heads are ready for the initial lapping process.

Figure 3:
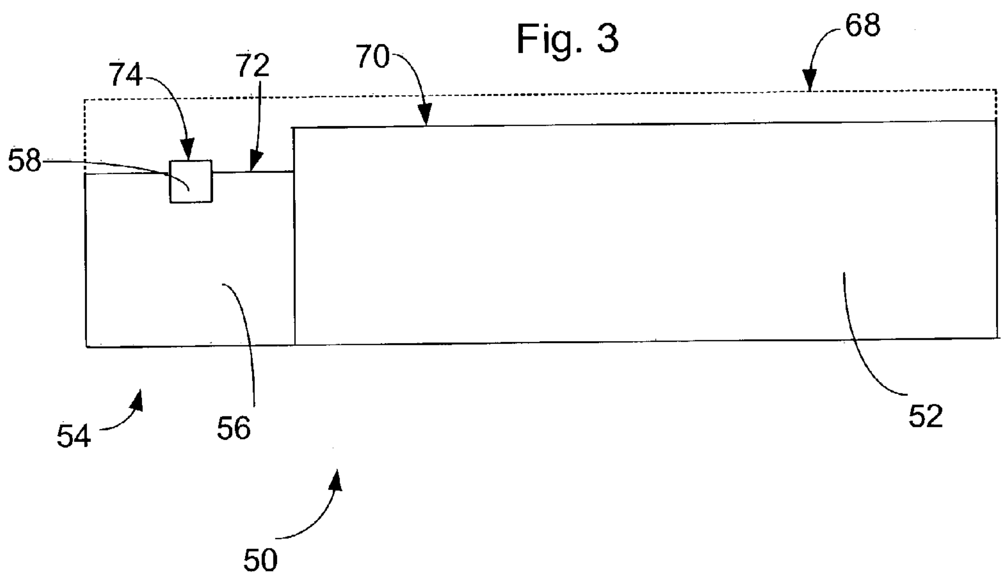
FIG. 3 is a schematic view of a portion of a magnetic recording head, after an initial lapping process is performed.

FIG. 3 shows the magnetic recording head 50 after initial lapping. The height of the substrate 52 has been reduced by the lapping process as seen by the dashed line 68 showing the top surface of the portion that was lapped away. In addition, the upper surface 70 of the substrate 52 may have been smoothed out to be more planar. Also, the alumina material 56 has been reduced in height and an upper surface 72 thereof made more planar. Most importantly, because the alumina material 56 is softer than substrate 52 ($Al_2O_3$—TiC), the height of the alumina material 56 has been reduced significantly more than the height of the substrate 52. If the magnetic recording head 50 was operated with the substrate 52 and alumina material 56 in this condition, the head 50 would have alumina recession (ALR) in the height difference between the substrate 52 and the alumina material 56. In addition, an upper surface 74 of the transducer 58 is recessed relative to the upper surface 70 of the substrate 52. If the head 50 was operated in this condition, the head 50 would suffer from pole tip recession (PTR) in the height difference between these two upper surfaces 70 and 74. This recession of the transducer 58 relative to the substrate 52 is known as pole tip recession because the poles of the write element are some of the major components and harder materials in the transducer 58.

Figure 4:
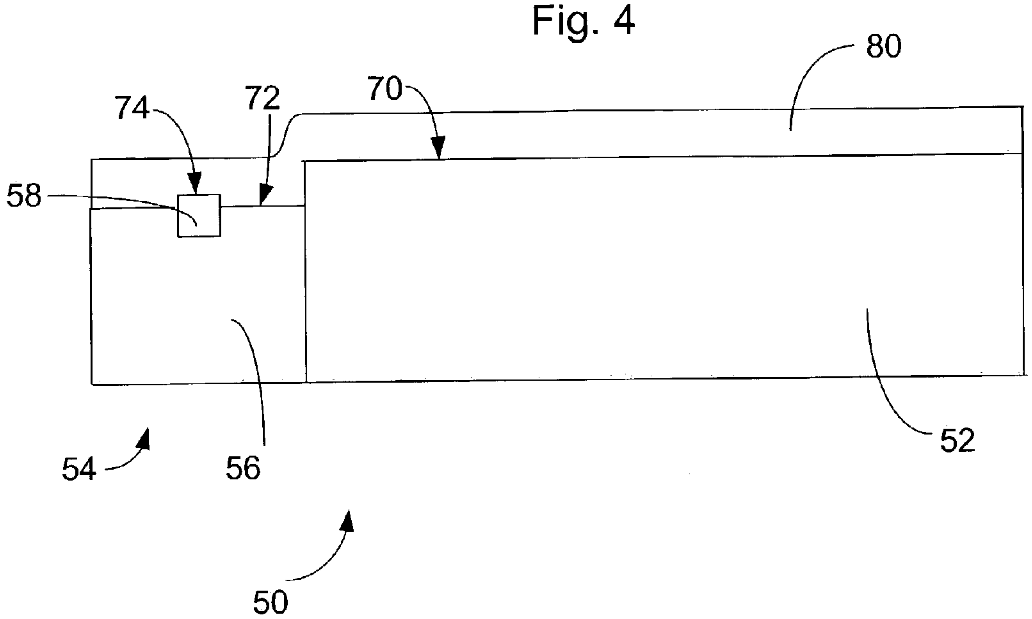
FIG. 4 is a schematic view of a portion of a magnetic recording head, after a sacrificial material is applied.

In prior art manufacturing processes, the next step would be to perform final kiss lapping of the magnetic recording head 50 shown in FIG. 3, and then the head 50 would be cleaned up and encapsulated. The manufacturing process of the present invention, however, includes a next step of applying a sacrificial material 80 to the upper surfaces 70, 72, and 74, as shown in FIG. 4. The exact composition of the sacrificial material 80 can be tailored to characteristics of the particular manufacturing and lapping processes being performed. An exemplary type of sacrificial material 80 is diamond-like carbon (DLC).

Figure 5:
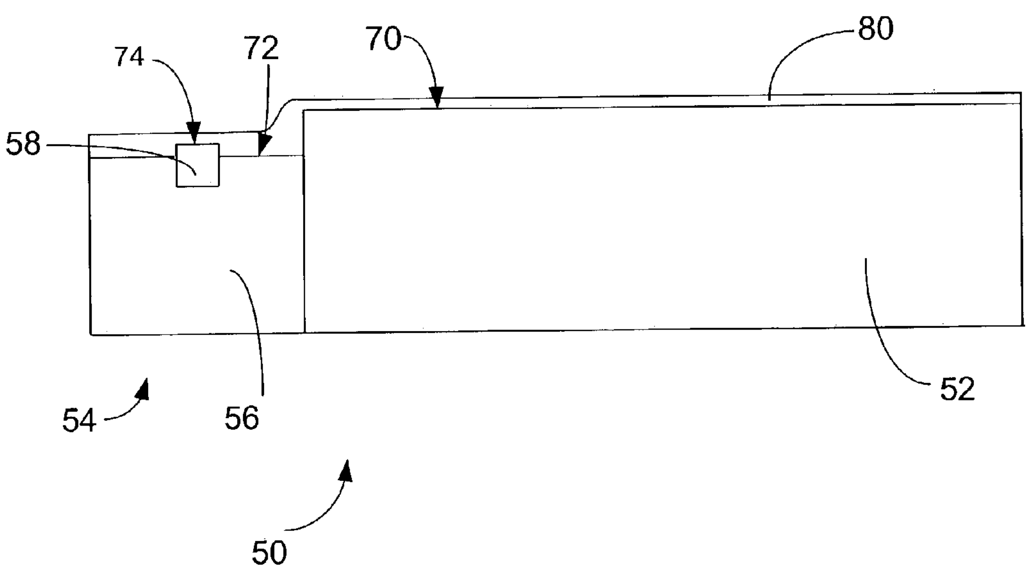
FIG. 5 is a schematic view of a portion of a magnetic recording head, after a final lapping process has removed a majority of the sacrificial material.
Figure 6:
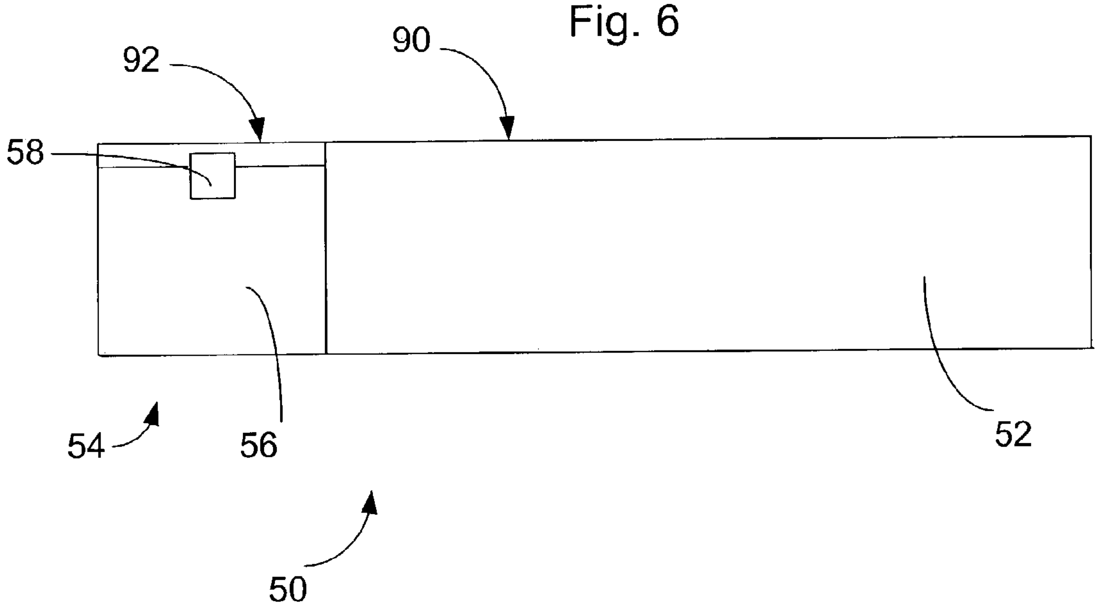
FIG. 6 is a schematic view of a portion of a magnetic recording head, after all of the sacrificial material above the substrate has been lapped away.

Next, further lapping is performed to remove most of the sacrificial material 80. As can be seen in FIG. 5, the sacrificial material 80 deposited on top of the upper surface 70 of the substrate 52 has been almost entirely lapped away. Because the sacrificial material 80 is deposited on top of the substrate 52, the alumina material 56, and the transducer 58, the decrease in height of the sacrificial material 80 across the portion of the magnetic recording head 50 shown in FIG. 5 should be uniform, or possibly the portion on top of the substrate 52 will decrease at a greater rate because it is closer to the lapping plate. Eventually, as the kiss lapping continues, the structure shown in FIG. 6 should be reached. In this structure, all of the sacrificial material 80 on top of the substrate 52 has been lapped away and a portion of the substrate 52 has also been lapped away. In this case, it may be possible to achieve the structure shown in FIG. 6 where an upper surface 90 of the substrate 52 is level with the upper surface 92 of the sacrificial material 80 on top of the transducer element 54. In this case, the amount of PTR is minimal and the amount of ALR is zero.

After final lapping, conventional finishing steps such as cleaning of the surfaces 90 and 92 and covering them with a DLC layer can also be performed. In this manner, the air bearing surface is formed.

It is possible to monitor the resistance of the magnetoresistive read element to determine when the lapping is beginning to impact or lap away portions of the transducer 58. This can be performed in real time while performing the final kiss lap or in an iterative fashion. For example, lapping can be performed, a measurement of the resistance can be made, and then a determination made whether to continue with the lapping. The process could continue in this iterative fashion. The method of the present invention can be utilized with traditional air bearing surfaces flown at some predetermined height above the disk or with burnished air bearings, particularly those including a micro wear pad composed of DLC material.

The sacrificial material 80 is selected for its hardness relative to the hardness of the substrate 52, the hardness of the alumina material 56, and the hardness of the transducer 58. In addition, the hardness is selected relative to the particular processing and methodology being implemented. Thus, the sacrificial material 80 may be in the range of the same hardness as the substrate 52, or it may be desirable for the hardness of the sacrificial material 80 to be significantly greater than the substrate 52. The hardness of the sacrificial material 80 may also be somewhere between the hardness of the substrate 52 and the alumina material 56. DLC is but one example of an acceptable sacrificial material 80. In addition, there are different types of DLC material having different hardnesses. A softer DLC material may be desirable for burnished air bearing applications while a harder DLC material may be desirable for conventional air bearing applications. As stated above, it is desirable to tailor the type or hardness of the sacrificial material 80 to the lapping rate and the particular process or situation.

It is believed that DLC has never previously been used before final lapping. Instead, DLC is believed to have only been previously used in the manufacturing of magnetic recording heads as the final step for corrosion protection and for tribology reasons.

The present invention has several advantages. First, the invention controls and reduces the amount of pole tip recession so that magnetic spacing loss in the disk drive is reduced. This reduction in magnetic spacing loss can increase the signal to noise ratio and/or increase the areal bit density. Another key advantage of the present invention is that contamination from the diamond material in the slurry of the lapping process that tended to stick in the softer alumina material and in metal materials in the transducer in prior art processes is greatly reduced because the DLC material rather than the alumina material is being lapped away. The diamond tended to embed in the softer alumina and metal materials.

The purpose of this technique is one of applying a hard protective covering to the alumina and ABS of the heads in row form just prior to final kiss lap process. At this stage of the head process, the transducer and alumina are already recessed from the previous coarser lapping steps. When the DLC is deposited, it will fill in the recessed area of the transducer and alumina to a level above the ABS. In the final lapping process, the surface will be planarized and because of the harder cover material, relative to the transducer and alumina as compared with the substrate, the natural recession process will be mitigated. Current PTR/ALR range is 3 to 5 nanometers. This present invention should achieve 0 to 1 nanometer range.

In the present invention, normal stripe height lapping processes will have already been completed. The lapping slurry will be optimized (e.g. pH level) to produce the desired transducer recession relative to alumina surface required to obtain the desired final PTR (assuming ALR equals zero from the present invention). Prior to the final kiss lap operation, the slider rows will be cleaned through the normal cleaning operations required before DLC sputtering. The rows will then have DLC applied to a thickness greater than the recession amount present on the slider rows (typical thickness would be 5 to 10 nanometers). No masking would be required, because complete coverage is acceptable. Once the rows are covered with DLC, the final kiss lap operation will be performed to the final strip height specification. The present invention allows optimization of the lapping steps required to achieve the desired stripe height while minimizing ALR and PTR. The present invention would also provide a hard surface covering to the soft metal device exposed at the ABS.

A current problem is that the diamond from the lapping process will embed in any material being lapped that is softer than the lap plate. If the diamond contamination and scratching is controlled (eliminated) during the stripe height lap process by means of chemical/mechanical polishing (CMP) then no new diamond contamination or scratching would be introduced to the final kiss lap process. This is beneficial because one of the primary side effects from the CMP is larger alumina recession. The DLC covering over (and filling in the recessed area of) the device structure would inhibit or possibly eliminate this diamond contamination and reduce and control the added alumina recession from the CMP.

Magnetic spacing loss is one of the primary constraints in continued areal density improvements. Advantageously, the present invention could buy back 0.1 micro inches (2.5 nanometers) of spacing loss. Specific advantages include the following. Implementation is very simple and would require no new process technology development. The process control is simplified since no masking is required. The present invention will eliminate lapping-reduced ALR and allow for optimized and better controlled PTR. Ultimately, this present invention gives the best opportunity to minimize PTR and eliminate ALR. The present invention is suitable for air bearing designs as well as fabricating the micro wear pad.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in is such, or other embodiments and with various modifications required by the particular application or use of the present invention. It is intended that the appended claims be construed to include alternative embodiments to the extent permitted by the prior art.

What is claimed is:

1. A method of making a read/write head, comprising:

depositing a read/write transducer and an encapsulation material on a substrate, wherein the transducer is embedded in the encapsulation material;

performing an initial lapping operation on the transducer, the encapsulation material and the substrate, thereby creating a lapped surface that includes the transducer, the encapsulation material and the substrate;

depositing a sacrificial material on the transducer, the encapsulation material and the substrate at the lapped surface, wherein the sacrificial material is harder than the encapsulation material; and performing an additional lapping operation on the sacrificial material.

2. The method of claim 1, wherein the transducer includes a magnetoresistive read sensor.

3. The method of claim 2, wherein the magnetoresistive read sensor is an anisotropic magnetoresistive read sensor, a giant magnetoresistive read sensor or a tunneling magnetoresistive read sensor.

4. The method of claim 1, wherein the transducer includes nickel iron.

5. The method of claim 1, wherein the encapsulation material includes aluminum oxide.

6. The method of claim 1, wherein the substrate includes aluminum oxide and titanium carbon.

7. The method of claim 1, wherein the sacrificial material is diamond-like carbon.

8. The method of claim 1, wherein the sacrificial material is between the hardness of the substrate and the encapsulation material.

9. The method of claim 1, wherein the sacrificial material is in the range of hardness of the substrate.

10. The method of claim 1, wherein the sacrificial material is harder than the substrate.

11. The method of claim 1, wherein the sacrificial material is significantly harder than the substrate.

12. The method of claim 1, wherein the sacrificial material covers the encapsulation material during the additional lapping operation, thereby reducing contamination and scratching of the encapsulation material.

13. The method of claim 1, wherein the sacrificial material is deposited by sputtering.

14. The method of claim 1, wherein the sacrificial material is deposited without masking.

15. The method of claim 1, wherein the initial lapping operation removes a portion of the encapsulation material.

16. The method of claim 1, wherein the initial lapping operation removes a portion of the substrate.

17. The method of claim 1, wherein the initial lapping operation creates a recess in the encapsulation material relative to the substrate.

18. The method of claim 17, wherein the depositing the sacrificial material fills in the recess.

19. The method of claim 17, wherein the additional lapping operation removes some but not all of the sacrificial material in the recess.

20. The method of claim 1, wherein the additional lapping operation does not lap the transducer.

21. The method of claim 1, wherein the additional lapping operation does not lap the encapsulation material.

22. The method of claim 1, wherein the additional lapping operation removes a portion of the substrate.

23. The method of claim 1, wherein the additional lapping operation removes at least a substantial majority of the sacrificial material in the region of the substrate.

24. The method of claim 1, wherein the additional lapping operation entirely or almost entirely removes the sacrificial material in the region of the substrate.

25. The method of claim 1, wherein the additional lapping operation entirely removes the sacrificial material in the region of the substrate.

26. The method of claim 1, wherein the additional lapping operation removes most of the sacrificial material.

27. The method of claim 1, wherein the additional lapping operation removes at least a substantial majority of the sacrificial material.

28. The method of claim 1, wherein the additional lapping operation entirely removes a portion of the sacrificial material adjacent to the substrate and does not entirely remove a portion of the sacrificial material adjacent to the encapsulation material.

29. The method of claim 1, wherein the additional lapping operation does not entirely remove a portion of the sacrificial material adjacent to the substrate and does not entirely remove a portion of the sacrificial material adjacent to the encapsulation material.

30. The method of claim 1, wherein the additional lapping operation creates a lapped planar surface that includes the sacrificial material and the substrate.

31. The method of claim 1, wherein the additional lapping operation creates a lapped planar surface that includes the sacrificial material and the substrate and excludes the transducer and the encapsulation material.

32. The method of claim 1, wherein the additional lapping operation includes chemical/mechanical polishing using a slurry that contains diamond, and the sacrificial material prevents diamond contamination of the encapsulation material.

33. The method of claim 1, wherein the additional lapping operation is a final lapping operation.

34. The method of claim 1, wherein the read/write head is adapted for reading from and writing to a disk.

35. The method of claim 1, including depositing diamond-like carbon on the sacrificial material and the substrate after the additional lapping operation, thereby forming an air bearing surface.

36. A method of making a read/write head, comprising:

depositing a read/write transducer and an encapsulation material on a substrate, wherein the transducer is embedded in the encapsulation material and includes a magnetoresistive read sensor, and the encapsulation material includes aluminum oxide;

performing an initial lapping operation on the transducer, the encapsulation material and the substrate, thereby creating a lapped surface that includes the transducer, the encapsulation material and the substrate and creating a recess in the encapsulation material relative to the substrate;

depositing a sacrificial material on the transducer, the encapsulation material and the substrate at the lapped surface, wherein the sacrificial material is diamond-like carbon that fills in the recess and is harder than the encapsulation material; and performing an additional lapping operation on the sacrificial material and the substrate without lapping the transducer and without lapping the encapsulation material, thereby removing most of the sacrificial material, wherein the sacrificial material remains in the recess and covers the encapsulation material during the additional lapping operation, thereby reducing contamination and scratching of the encapsulation material by the additional lapping operation.

37. The method of claim 36, wherein the sacrificial material is harder than the substrate.

38. The method of claim 36, wherein the sacrificial material is deposited without masking.

39. The method of claim 36, wherein the additional lapping operation removes at least a substantial majority of the sacrificial material.

40. The method of claim 36, wherein the additional lapping operation entirely removes a portion of the sacrificial material adjacent to the substrate and does not entirely remove a portion of the sacrificial material adjacent to the encapsulation material.

41. The method of claim 36, wherein the additional lapping operation creates a lapped planar surface that includes the sacrificial material and the substrate and excludes the transducer and the encapsulation material.

42. The method of claim 36, wherein the additional lapping operation includes chemical/mechanical polishing using a slurry that contains diamond, and the sacrificial material prevents diamond contamination of the encapsulation material.

43. The method of claim 36, wherein the additional lapping operation is a final lapping operation.

44. The method of claim 36, wherein the read/write head is adapted for reading from and writing to a disk.

45. The method of claim 36, including depositing diamond-like carbon on the sacrificial material and the substrate after the additional lapping operation, thereby forming an air bearing surface.

46. A method of making a read/write head for a data storage application, comprising:

depositing a read/write transducer and an encapsulation material on a substrate, wherein the transducer is embedded in the encapsulation material and includes a magnetoresistive read sensor, and the encapsulation material includes aluminum oxide;

performing an initial lapping operation on the transducer, the encapsulation material and the substrate, thereby creating a lapped surface that includes the transducer, the encapsulation material and the substrate and creating a recess in the encapsulation material relative to the substrate;

depositing a sacrificial material on the transducer, the encapsulation material and the substrate at the lapped surface, wherein the sacrificial material is diamond-like carbon that fills in the recess and is harder than the encapsulation material; and performing an additional lapping operation using chemical/mechanical polishing on the sacrificial material and the substrate without lapping the transducer and without lapping the encapsulation material, thereby removing most of the sacrificial material, wherein the sacrificial material remains in the recess and covers the encapsulation material during the additional lapping operation, thereby eliminating contamination and scratching of the encapsulation material by the additional lapping operation.

47. The method of claim 46, wherein the sacrificial material is harder than the substrate.

48. The method of claim 46, wherein the sacrificial material is deposited without masking.

49. The method of claim 46, wherein the additional lapping operation removes at least a substantial majority of the sacrificial material.

50. The method of claim 46, wherein the additional lapping operation entirely removes a portion of the sacrificial material adjacent to the substrate and does not entirely remove a portion of the sacrificial material adjacent to the encapsulation material.

51. The method of claim 46, wherein the additional lapping operation creates a lapped planar surface that includes the sacrificial material and the substrate and excludes the transducer and the encapsulation material.

52. The method of claim 46, wherein the additional lapping operation includes chemical/mechanical polishing using a slurry that contains diamond, and the sacrificial material prevents diamond contamination of the encapsulation material.

53. The method of claim 46, wherein the additional lapping operation is a final lapping operation.

54. The method of claim 46, wherein the read/write head is adapted for reading from and writing to a disk.

55. The method of claim 46, including depositing diamond-like carbon on the sacrificial material and the substrate after the additional lapping operation, thereby forming an air bearing surface.

* * * * *